United States Patent [19]

Morita et al.

[11] Patent Number: 4,540,180

[45] Date of Patent: Sep. 10, 1985

[54] ELECTRONIC TARGET HUNTING GAME APPARATUS

[75] Inventors: Akitaka Morita, Nara; Hiroshi Nittaya, Yamatokoriyama, both of Japan

[73] Assignee: Sharp Kabushiki Kaisha, Osaka, Japan

[21] Appl. No.: 521,934

[22] Filed: Aug. 10, 1983

[30] Foreign Application Priority Data

Aug. 20, 1982 [JP] Japan .................................. 57-145080

[51] Int. Cl.$^3$ ............................................... A63F 9/02
[52] U.S. Cl. ..................................... 273/313; 273/1 E
[58] Field of Search ...................... 273/1 E, 85 G, 237, 273/238, DIG. 28, 313, 314, 316; 364/410–412

[56] References Cited

U.S. PATENT DOCUMENTS 4,065,130 12/1977 Geraci ................................. 273/238
4,171,135 10/1979 Doyle et al. ........................ 273/237
4,398,086 8/1983 Smith ................................... 273/1 E

FOREIGN PATENT DOCUMENTS

2041594 9/1980 United Kingdom ................ 273/313

*Primary Examiner*—Richard C. Pinkham
*Assistant Examiner*—MaryAnn Stoll Lastova
*Attorney, Agent, or Firm*—Birch, Stewart, Kolasch & Birch

[57] ABSTRACT

An electronic game apparatus independently provided or to be incorporated into an electronic calculator, timepiece, or the like comprises a game start circuit, a game setting circuit, a memory, a search circuit, an indication circuit, a comparison circuit, a bombardment circuit, and a display. The game start circuit is operated to start a game. The game setting circuit is provided for setting a matrix size and for setting at least one target therein. The memory is provided for storing the matrix size and the target position. The search circuit is provided for searching the target position by a search area. The indication circuit is provided for indicating whether the target is positioned inside the search area. The bombardment circuit is provided for inputting the target position data searched. The comparison circuit is provided for comparing the target position and the target position data searched. The display is provided for displaying the game data used for these circuits.

7 Claims, 20 Drawing Figures

ELECTRONIC TARGET HUNTING GAME APPARATUS

BACKGROUND OF THE INVENTION

The present invention relates to an electronic game apparatus and, more particularly, to an electronic game calculator or timepiece.

As conventional electronic calculators, timepieces or the like comprise displays for displaying a plurality of digits, it may be possible to use the displayed digits as part of electronic game machines. In this respect, several game devices have been proposed in an attempt to incorporate these devices into the calculators, timepieces or the like.

However, the kind of game incorporated into the conventional game calculators or timepieces are rather simple.

Therefore, it is desired to provide an improved electronic game apparatus to expand the variety of electronic games.

SUMMARY OF THE INVENTION

Accordingly, it is an object of the present invention to provide an improved electronic game apparatus for presenting an improved electronic game.

It is another object of the present invention to provide an improved electronic game apparatus for presenting an improved electronic game having an aspect of thinking and timekeeping. Briefly described, in accordance with the present invention, an electronic game apparatus independently provided or to be incorporated into an electronic calculator, an electronic timepiece, or the like comprises a game start means for starting a specific game, a game setting means for setting a virtual X-Y matrix to set a target over the matrix and for setting the position of at least one target within the matrix, a memory for storing the matrix size and the target position, a search means for searching the target in the matrix, an indication means for indicating whether the target is positioned within the searched area by the search means, a bombardment means for inputting target position data and for shooting a beam toward the target, a comparison means for comparing the target position stored within the memory means and the target position data inputted by the bombardment means.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 4-(a) to 4-(l) show display conditions of a display according to the game of the present invention;

DESCRIPTION OF THE INVENTION

The electronic game apparatus can be made independent or incorporated into any other device. According to a preferred embodiment of the present invention, the game apparatus is incorporated into an electronic calculator to form an electronic game calculator.

Figure 1:
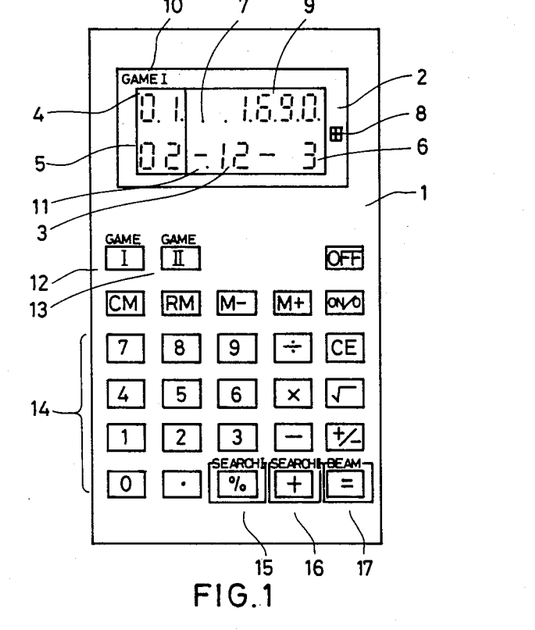
FIG. 1 shows a plan view of an electronic calculator as an electronic game apparatus according to the present invention.

FIG. 1 shows a plan view of an electronic game calculator according to the present invention.

The electronic game calculator comprises a body 1, a display 2, two game keys 12 and 13, a keyboard 14, and game function keys 15 to 17.

The display 2 includes 8 digits each at the upper and the lower levels. In a calculator mode, the upper level display is used to display calculated data, while the lower level display is used to display memory data and constant data.

In a game mode, a matrix size display 3, an X coordinate display 4, a Y coordinate display 5, a search ability display 6, a radar or beam display 7, a searched target display 8, a game time display 9, a game mode display 10, and a target number display 11 are illustrated.

The matrix size display 3 displays the size of an X-Y matrix used for the game. In this example, the matrix has a size of "12×12". The X coordinate display 4 displays X coordinate data. The Y coordinate display 5 displays Y coordinate data.

The search ability display 6 displays an ability of searching a search matrix to be searched by a second search mode. In this example as shown in FIG. 1, the search ability display 6 shows that a search matrix of "3×3" (which has 9 blocks) can be searched.

The radar or beam display 7 shows that, during searching, a search radar is scanned toward a target or that a beam is shot to strike the target. The radar display 7 is decimal point dots at the upper level display. Each time a radar or a beam is scanned or shot, the decimal point dots are illuminated from the left side, sequentially. The searched target display 8 becomes illuminated when the target is within the search matrix. This display 8 is a cross-in-square. The game time display 9 displays an elapsed game time. The game mode display 10 indicates a game mode selected. The target number display 11 indicates the number of targets on the virtual X-Y matrix. This display 11 is decimal point dots.

The first game key 12 is actuated to select and perform one kind of game as "GAME I" together with the display of "GAME I" in the game mode display 10. The second game key 13 is actuated to select and perform another kind of game as "GAME II" together with the display of "GAME II" in the game mode display 10. The keyboard 14 includes ten keys and some function keys as in a conventional calculator. During the game mode, these keys are actuated to input the matrix size and X or Y coordinate data.

As the game function keys, the key 15 is actuated to perform a first search mode. The key 16 is actuated to perform a second search mode. The key 17 is actuated to shoot a beam.

Figure 2:
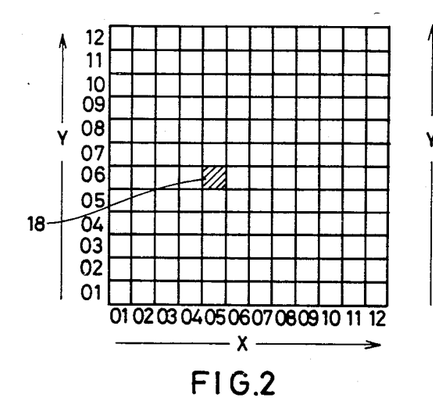
FIG. 2 shows a virtual X-Y matrix with a target used for the apparatus of the present invention.

FIG. 2 shows the virtual X-Y matrix with a target therein used for the game of the present invention.

The matix of FIG. 2 has a size of "12×12" and contains a target 18 therein. The position of the target 18 is recorded as being "05" as X coordinate data and "06" as Y coordinate data.

Figure 3:
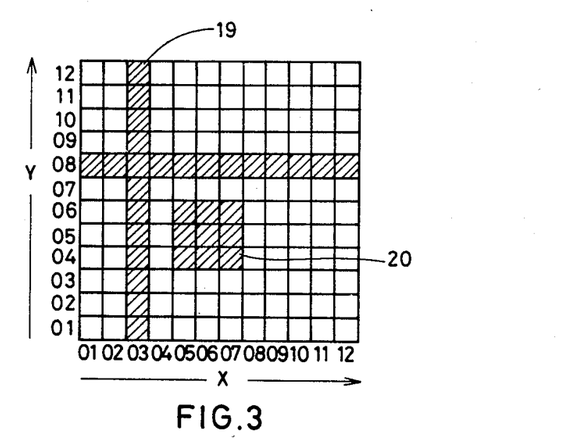
FIG. 3 shows the matrix which is subjected to a target search mode in the game of the present invention.

FIG. 3 shows a search mode used for the game of the present invention.

In FIG. 3, a search area 19 is referred to the zone over which the first search mode has been performed. The search area 19 is denoted as "X=03, Y=08" as indicated with the shadowed area. In a first search mode the radar is scanned vertically and horizontally along a selected Y and X coordinate, respectively.

Figure 4:
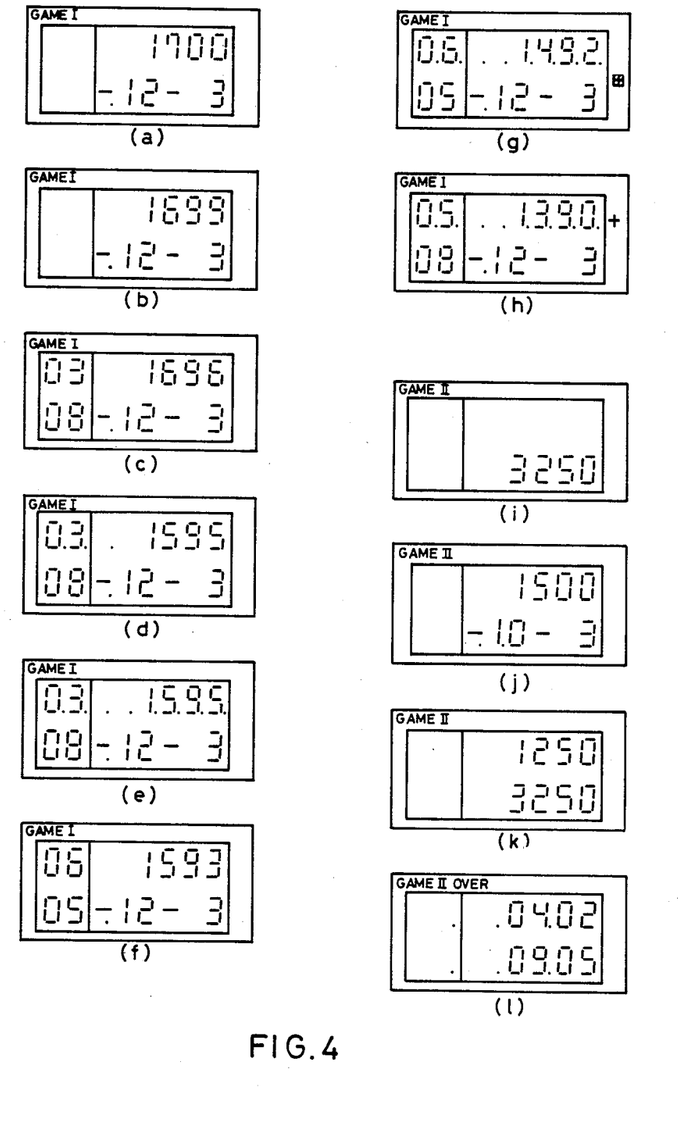

A second search area 20 is referred to a block zone over which a second search mode may be performed. The search matrix of "3×3" (having 9 blocks) is provided as this mode. In the second search mode, when the target is present in the search matix, the target display 8 is illuminated. FIGS. 4(a) to 4(c) show display examples of the game according to the present invention.

To start "GAME I", a power on/clear (ON/C) key is firstly operated, so that a specific matrix size is inputted in terms of a two-figure integer by operating the keys in the keyboard 14. The first game key 12 is actuated to select this mode.

The object of the game of the present invention is to search the target position with the first and the second search modes, and to shoot the target with the beam before the power has become zero.

FIG. 4(a):

The actuation of the game key 12 permits the symbol of "GAME I" to be illuminated. Further, the display 2 shows power (matrix size ×100+500) corresponding to the matrix size, the matrix size to be selected, the ability of the second search mode (3×3), and the target number. Under these conditions, the game of "GAME I" starts.

A circuit of the game calculator fuctions to illustrate a matrix having the selected matrix size, to generate target coordinate data using a random number generator, and to store the target coordinate data. Thus, the data of FIG. 2 are ready.

FIG. 4(b):

When the game starts, a count-down timer starts to count down the power in proportion to time. For example, a unit per second is reduced. The unit is a dimension of the power. It is assumed that X,Y coordinate data of (03, 08) are inputted, so that the first search mode is operated to generate the search pattern 19 illustrated in FIG. 3.

FIG. 4(c):

The keyboard 14 is actuated to input the data of (03, 08). The first two figures of "03" are displayed in the X coordinate display 4 at the 7th and the 8th digits of the upper level display and the second two figures of "08" are displayed in the Y coordinate display 5 at the 7th and the 8th digits of the lower level display.

FIGS. 4(d) and (e):

The first search key 15 is actuated to start the first search mode, so that the decimal point dots at the upper level display are running, together with a target attack sound, from the 8th digit to the 1st digit to indicate that a searching radar is emitted.

The first search mode is to scan the respective one of the entire X and Y coordinate data inputted as shown by the area 19 in FIG. 3.

When the decimal point dots reach the 1st dot, it is displayed whether the target is present within the searched area. In FIG. 4(e), no target is present, so that no display is enabled. The decimal point dots are all erased. As FIG. 4(h) shows, the presence of the target permits the target display 8 to be illuminated.

FIG. 4(f):

The data of (06, 05) are inputted and the second search key 16 is actuated, so that the second search mode is implemented. When the second search key 16 is actuated, the similar display with the similar target attack sound is enabled.

FIG. 4(g):

As shown by the search matrix 20 in FIG. 3, a search matix having a core at the inputted coordinate data (06, 05) is formed, so that the second search mode is conducted within the search matrix of "3×3" which equals the ability of the second search mode as indicated by the search ability display 6. In this example, the target is present within the area of the search matrix, so that the target display 8 is illuminated.

It is premature to shoot the beam since it is uncertain where the target is positioned within the small matrix and the possibility of the beam's striking the target is 1/9.

It is detected whether the target is positioned at any of coordinates data of (05, 04), (05, 05), and (05, 06). It may be possible to use either of the first search mode or the second search mode. In this example, the first search mode is employed.

FIG. 4(h):

The data (05, 08) are inputted. By rule, any data except "04" to "06" are available for the Y coordinate data. The first search key 15 is operated, so that the target is detected and the radar display 8 is illuminated.

Now, it is assured that the target is positioned at any of the coordinate data of (05, 04), (05, 05) and (05, 06). The possiblity of the beam's striking the target is $\frac{1}{3}$, so that, in view of the large amount of the remaining power, it may be possible to shoot the beam, otherwise, further search is conducted to limit the position of the target.

Thus, either or both of the first search mode and the second search mode are conducted to limit the position of the target. Finally, the target position is inputted by operating the keyboard 14 and the beam is shot toward the target position. When the beam is shot, the running of the decimal point dots together with the target attack sound is operated at the upper level display. When the beam strikes the target, the illuminated dots are erased with a bombing sound.

The power display displays a score calculated on the basis of the remaining energy when the target is struck+500. The game is over.

If the target is not struck, the decimal point dots are erased, so that the game will continue. When the remaining power is zero, the game becomes over. At this time, no score is stored.

The performance of either the first search mode or the second search mode consumes a predetermined energy of "100 units". The shot of the beam consumes a predetermined energy of "300 units". This is the reason why the search operations must be conducted effectively.

The coordinate data of the matrix size to be selected can be selected from "10" to "50". In "GAME I", the single target is set. When either the first search mode or the second search mode is conducted three times, the target position is shifted by "1" along either the X axis or the Y axis.

In "GAME II", basic a game structure is identical to that of "GAME I". However, in "GAME II", the matrix size cannot be selected. Otherwise, the matrix size is set to be "10×10" at the beginning of the game. When the target is bombarded, the matrix size is enlarged to be "11×11". Until all the power has been consumed and the game is over, the matrix size is continuously enlarged by "1". In "GAME II", a plurality of targets are set, so that the number of the targets increases as the matrix size increases. For example, 2 targets are set while the matrix size is from "10×10" to "29×29", 3 targets are set while the matrix size is "30×30" to "39×39", and 4 targets are set while the matrix size is from "40×40" to "50×50".

The "GAME II" starts by operating the "ON/C" key and the second game key 13.

FIG. 4(i):

The display of "GAME II" is illuminated. The maximum score is displayed for a time, for example, 2 seconds.

FIG. 4(j):

The power, the matrix size, and the search ability are displayed, to start the game.

The target is scanned in a similar manner as in "GAME I", except that the plurality of targets are set in "GAME II". Each time a single target is bombarded, a bonus power, for example, of "1000 units" is given. The number of the decimal point dots at the lower level display is reduced by "1".

FIG. 4(k):

When all the targets have been bombarded, the upper level display shows the current score and the lower level display shows the maximum score for a time, for example, 2 seconds.

The matrix size increases by "1", so that the game continues. When all the power has been consumed, the game is over.

FIG. 4(l):

When the game is over, an alarm is sounded, so that the display of "GAME II OVER" is illuminated. The target positions are displayed at a predetermined time depending on the number of the targets. For example, target positions are displayed for about 2 seconds for a single target, and about 3 seconds for 3 targets. In this example, the targets are positioned at (02, 05) and (04, 09).

FIG. 4(k):

The score gained is displayed. The maximum score is stored while the calculator power is off. When a new maximum score is gained over the previous maximum score, the new maximum score is stored in place of the previous one.

Figure 5:
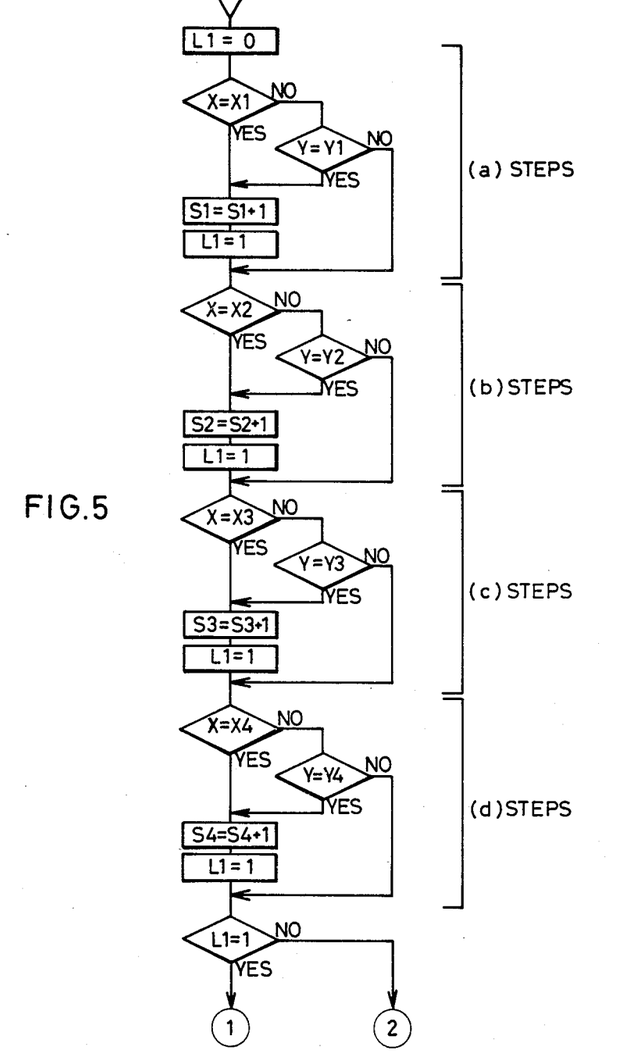
FIGS. 5 to 8 show each flow chart used for the game of the present invention.
Figure 6:
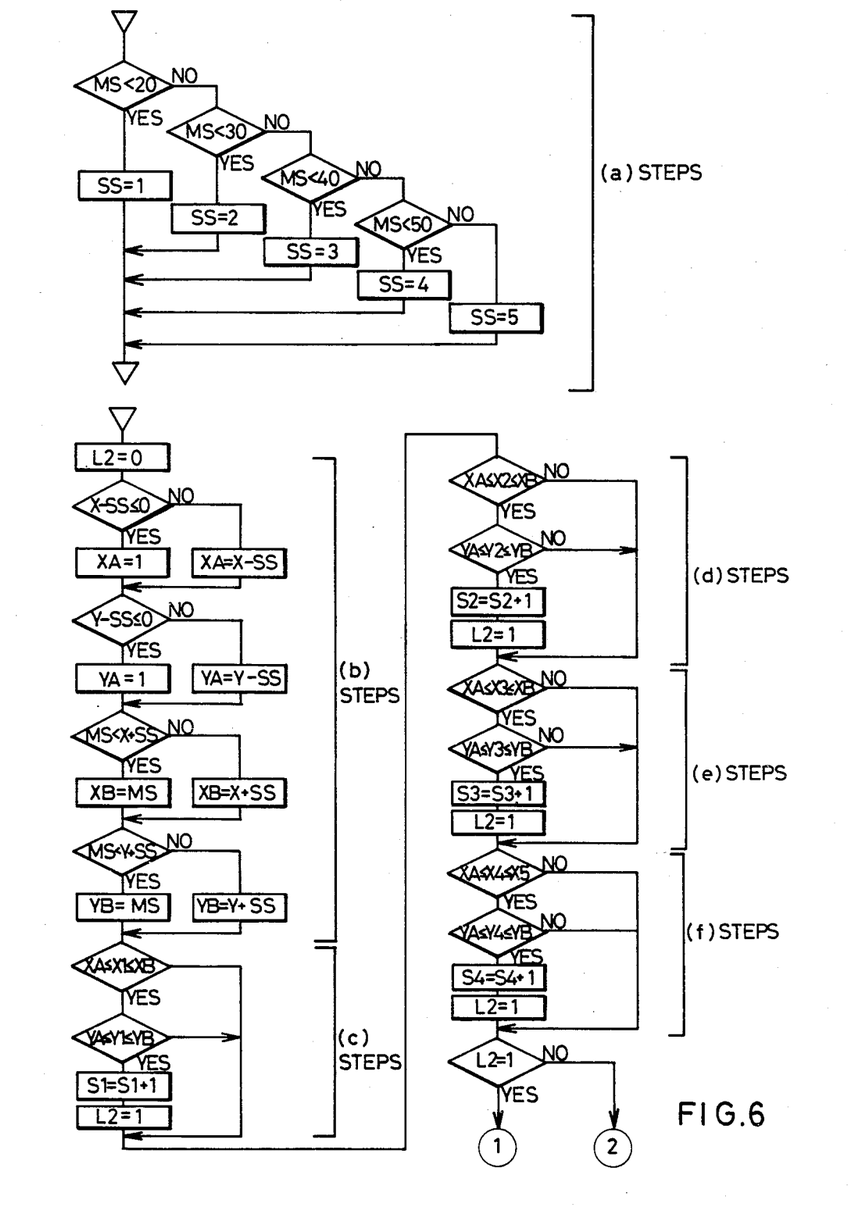

FIGS. 5 and 6 show a flow chart of the first search mode and the second search mode, respectively.

In FIG. 5, the following items are used:

(X, Y): the coordinate data inputted with the keys
(X1, Y1): the coordinate data for the 1st target
(X2, Y2), (X3, Y3), (X4, Y4): the respective coordinate data of the targets
S1, S2, S3, and S4: the number of scanning the respective targets
L1: a flip-flop for illuminating the radar display As stated above, "GAME I" gives a single target. "GAME II" gives a plurality of targets, for example, "2" to "4".

When the game starts, random number generator generates the position data of the targets depending on the matrix size. When the size coordinate data of the matrix is "15", random numbers of "01" to "15" are generated. These data are stored as (X1, Y1) to (X4, Y4). As to a target which is not present as the positive or the negative data on the X or Y coordinate data, the origin (0, 0) is set. When the plurality of targets are generated, their target positions are differed from each other.

The coordinate data of the targets are inputted. The first search key 15 is actuated. Upon the input of the coordinate data, it is detected whether the coordinate data are contained within the set matrix size. That is, while the size data of the matrix is set to be "15", the input of "20" as the coordinate data and the actuation of the first search mode key 15 is noneffective. If the coordinate data are contained within the side data of the matrix size, the flow chart of FIG. 5 is conducted.

FIG. 5(a):

It is detected whether the inputted coordinate data "X" correspond to the coordinate data "X1" of the 1st target having (X1, Y1). When they correspond, the counter S1 is counted up to set the flag L1 to illuminate the radar display 8 as indicated by "L1=1". When they do not correspond, it is detected whether the coordinate data Y correspond to the coordinate data "Y1" of the 1st target. When they correspond, similar operations are conducted. If not, Steps (b) and the following steps are selected to detect whether the next target is present.

After steps (a) have finished, steps (b) related to the 2nd target, steps (c) related to the 3rd target, and steps (d) related to the 4th target are conducted.

Figure 7:
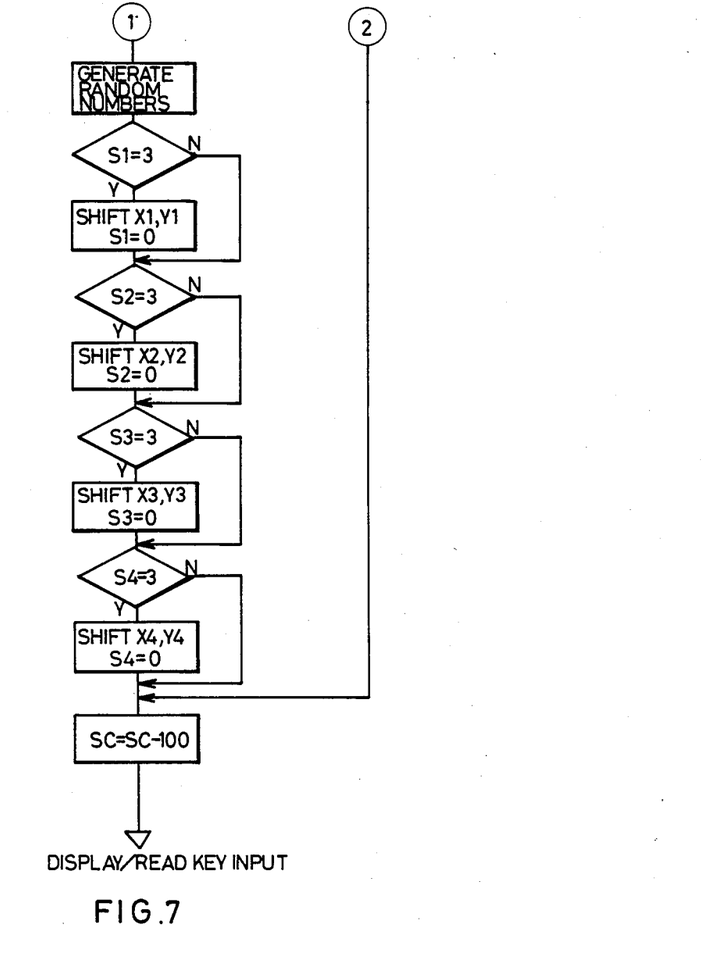

The flag L1 indicates that the search radar of the first search mode hits the target. The flat L1 is related to the dots of the radar display 8. Therefore, the set of the flag L1 permits the radar display 8 to be illuminated. When "L1=1 (set)", as shown in FIG. 7, it is detected whether the targets are exposed to the radar search scanning three times. The coordinate positions of the triple-searched target are shifted by "1" in either direction of the X and Y axis according to the random number. If the shifted coordinate data are outside the matrix, the shift direction of the target is reversed. Thereafter, "100 units" is subtracted from the gained score "SC". When "L1=0", namely, any hit of the radar searching scanning is absent, a calculation of "SC−100" is conducted.

As noted from the flow chart of FIG. 5, even when a single radar search can detect the plurality of targets, the radar results cannot provide any information of the target number, so that the target number must be assumed.

With reference to FIG. 6, the second search mode is explained. The search ability of the second search mode is different depending on the matrix size. As the matrix size increase, the search ability is improved. The search ability is "3×3" for the matrix size of "10-19", "5×5" for the matrix size of "20-29", "7×7" for the matrix side of "30-39", "9×9" for "40-49", and "11×11" for "50".

In FIG. 6, the following symbols are illutrated:

MS: the matrix size
SS: a constant according to the search ability of the second search mode
XA-XB: a searchable X coordinate region
YA-YB: a searchable Y coordinate region
L2: a flip-flop for illuminating a radar display

FIG. 6(a):

A constant "SS" is defined according the matrix size at the game start.

FIG. 6(b):

It is controlled that the coordinate data of XA, XB, YA, and YB for defining the searchable region are not outside the coordinate size of the matrix.

That is, when the matrix size is "15", the constant "SS" is "1". When the inputted X coordinate data is (01), a calculation of "X-SS=O" is obtained, so that such coordinate position is outside the matrix. Then, in place of "XA=X-SS", "XA=01" which is inside the matrix is inputted. In this manner, the search ability of the second search mode is calculated.

It is detected whether the coordinate data "X1" of the 1st target are inside the region from "XA" to "XB". If inside, it is detected whether the Y coordinate data of the 1st target is inside the region form the "YA" to "YB". If inside, this means that the 1st target is present, being inside the matrix size. The counter "S1" is counted up and the flip-flop "L2" is set.

In this manner, the 2nd to the 4th targets are detected. When "L2=1", the radar display is illuminated. When the "S1" to "S4" are 3, the target position is shifted as similar to the case of the first search mode.

Figure 8:
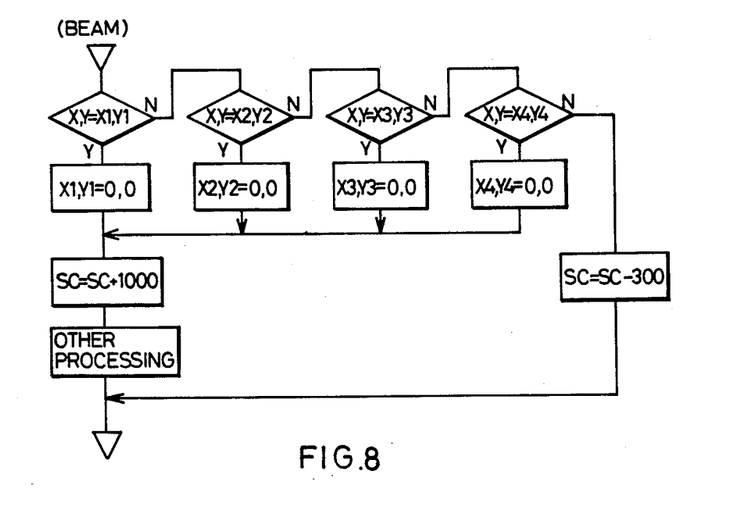

FIG. 8 shows a flow chart of shooting the beam toward the target.

According to this flow chart, it is detected whether the X and the Y coordinate data selected equal the coordinate data for the target. When the coordinate data of some target equal the coordinate data of the beam, the circuit permits the data of (0, 0) to be inputted to erase the target. The bonus score of "100 units" is added to the amount of "SC". When the coordinate data of the target do not equal the coordinate data of the beam, a misshoot penalty of "300 units" is subtracted.

Figure 9:
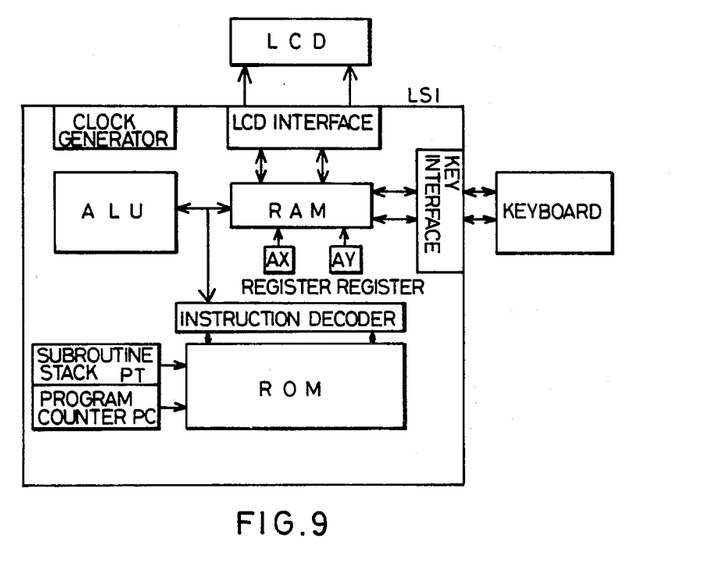
FIG. 9 shows a block diagram of a circuit implemented within the game apparatus of the present invention.

In the flow chart of FIG. 8, the following symbols are used:

X: the X coordinate data key-inputted
Y: the Y coordinate data key-inputted
X1-X4: the respective X coordinate data of the targets
Y1-Y4: the respective Y coordinate data of the targets
S1-S4: a counter for counting the hit number of the radar's searching the targets
L1: a flag for indicating that a radar of the first search mode hits the target
L2: a flag for indicating that a radar of the second search mode hits the targets
MS: the matrix size
SS: a constant for defining a searchable region depending on the matrix size
XA: the X coordinate data of the left side of the searchable region
XB: the X coordinate data of the right side of the searchable region
YA: the Y coordinate data of the upper side of the searchable region
YB: the Y coordinate data of the lower side of the searchable region
SC: the score FIG. 9 shows a circuit implemented within the game calculator of FIG. 1.

The circuit of FIG. 9 comprises a keyboard, an LSI, and a liquid crystal display (LCD).

The LSI comprises a ROM, an instruction decoder, a subroutine stack (ST), and a program counter (PC), which operates as a controller. The memory sections of the LSI are a RAM, an AX register, and an AY register. The AX register is operated as a data pointer for selecting a file of the RAM. The AY register is operated as the other pointer for selecting a figure of the RAM.

The operation unit of the LSI is an arithmetic and logical unit (ALU). A liquid crystal display (LCD) interface is provided for interfacing with the LCD. A key interface is provided for interfacing with the keyboard. The keyboard is related to the keyboard 14 of FIG. 1. A clock generator is provided as a power source clock circuit.

The ROM stores the programs for performing the game operations of the present invention. The ROM provides various instructions via the instruction decoder. The subroutine stack (ST) stores several subroutines used while performing the programs. The program counter (PC) is provided as a counter for addressing the programs.

The RAM includes 7 registers to store the data and the calculated data, and serve as the flags. The ALU serves to calculate operations based on the programs as stored in the ROM.

While only certain embodiments of the present invention have been described, it will be apparent to those skilled in the art that various changes and modifications may be made therein without departing from the spirit and scope of the present invention as claimed.

What is claimed is:

1. An electronic game apparatus comprising:
   keyboard means including a plurality of numerical keys and function keys;
   game start means for selectively actuating a specific electronic game mode;
   game set means responsive to the game start means for setting an X-Y coordinate matrix of a selected size and for positioning at least one target inside the matrix, the position of said target being defined by randomly selected X-Y coordinates;
   memory means responsive to the game set means for storing the X-Y coordinate matrix size and the target position;
   first search means actuated by said keyboard means for scanning a pair of intersecting lines within said X-Y matrix, defined by selected X and Y coordinates, for the presence of said target;
   second search means actuated by said keyboard means for scanning a rectangular block within said X-Y matrix, defined by a selected range of X and Y coordinates, for the presence of said target;
   indication means responsive to the first and second search means for indicating whether the target is in said first and second lines or rectangular block;
   bombardment means for supplying a signal to a selected coordinate within said first and second lines or rectangular block in an attempt to hit said target with said signal;
   display means for displaying data of the matrix size, the target number, the search region of the first and second search means in the matrix, and for displaying the results of the bombardment.

2. The apparatus of claim 1, further comprising timer means for setting a length of time upon actuation of the game start means and for counting down the time according to a predetermined duration of a game.

3. The apparatus of claim 1, further comprising energy setting means responsive to the game set means for setting an energy amount according to said game mode selected wherein said energy amount may be reduced in proportion to an elapsed game time.

4. The apparatus of claim 1, wherein the electronic game apparatus is incorporated into an electronic calculator and has common keys with the keyboard thereof.

5. The apparatus of clam 2, wherein the electronic game apparatus is incorporated into an electronic timepiece which constitutes said timer means in a game mode.

6. The apparatus of claim 1 further including means for counting the number of times that each of said first or second search means are utilized for a given target position and target shift means for moving the target to a new position within said matrix when said number of times exceeds a predetermined limit.

7. The apparatus of claim 1 wherein said game set means is responsive to the generation of each signal of said bombardment means for enlarging the size of said X-Y coordinate.

* * * * *